United States Patent

Steeb et al.

[11] Patent Number: 5,937,742
[45] Date of Patent: Aug. 17, 1999

[54] WAFFLE BAKER WITH IMPROVED BAKING CONSISTENCY

[75] Inventors: William R. Steeb, Shawnee; Charles H. Nickloy, III, Edwardsville, both of Kans.

[73] Assignee: Heartland Food Products, Inc., Shawnee Mission, Kans.

[21] Appl. No.: 09/208,070

[22] Filed: Dec. 9, 1998

[51] Int. Cl.⁶ .............................. A47J 37/00; A47J 37/06
[52] U.S. Cl. .............................. 99/375; 99/376; 99/377; 99/378; 99/380
[58] Field of Search .............................. 99/327–332, 337, 99/372–384; 219/524, 521, 441, 442, 250–252

[56] References Cited

U.S. PATENT DOCUMENTS

| | | |
|---|---|---|
| 1,661,294 | 3/1928 | Lemaster . |
| 1,754,800 | 4/1930 | Preston .................................. 99/378 X |
| 2,250,966 | 7/1941 | Propernick et al. . |
| 2,308,091 | 1/1943 | McCullough . |
| 2,663,785 | 12/1953 | Graham . |
| 3,852,569 | 12/1974 | Potvin ..................................... 219/525 |
| 3,963,898 | 6/1976 | Tuckwell ............................... 99/375 X |
| 5,138,938 | 8/1992 | McClean .................................. 99/331 |
| 5,197,377 | 3/1993 | Jennings et al. ....................... 99/390 X |
| 5,255,595 | 10/1993 | Higgins ................................. 99/372 X |
| 5,619,907 | 4/1997 | Orgelmacher ......................... 99/377 X |
| 5,636,564 | 6/1997 | Weiss . |

Primary Examiner—Timothy F. Simone
Attorney, Agent, or Firm—Litman, Kraai & Brown, L.L.C.; John C. McMahon

[57] ABSTRACT

A waffle baker includes a stationary stand which mounts a clam shell style baker assembly such that the baker assembly can be freely rotated relative to the stand. The baker assembly includes an upper and a lower shell, within each of which is mounted a stainless steel bowl which acts as a heat reflecting shield to reflect heat toward a respective light weight, quick heating griddle. A series of tabs are positioned on and extend upward from each of the reflective bowls with the tabs on each bowl supporting a respective heating cal rod in position above the floor of that bowl. The lower shell reflecting bowl includes a central opening which is surrounded by an upstanding perimeter wall to receive a bi-metal temperature sensing switch and isolate it from the cal rods and from heat reflected by the bowl. Other features include a timer automatically operated when the shells are rotated and a griddle design which places the bi-metal sensor relative to the griddle so that temperature sensing is virtually instantaneous.

24 Claims, 5 Drawing Sheets

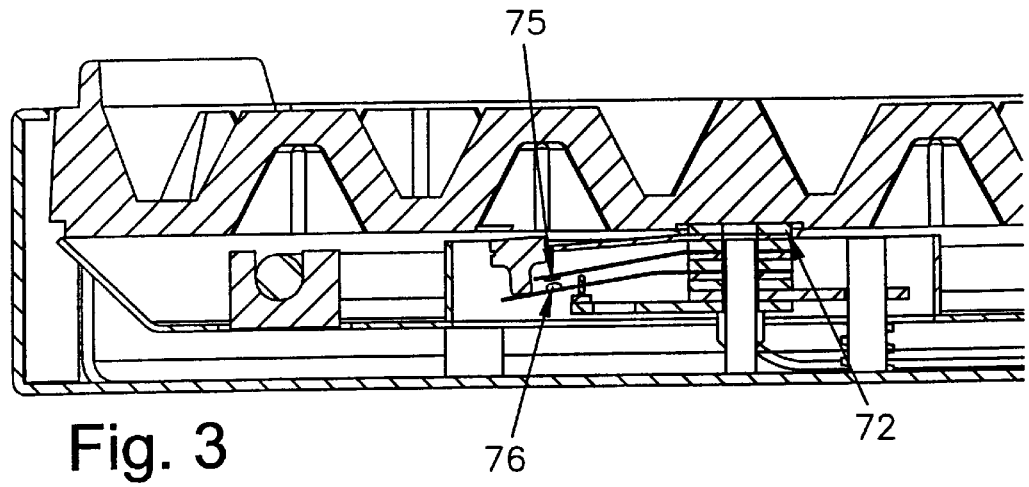
Fig. 3
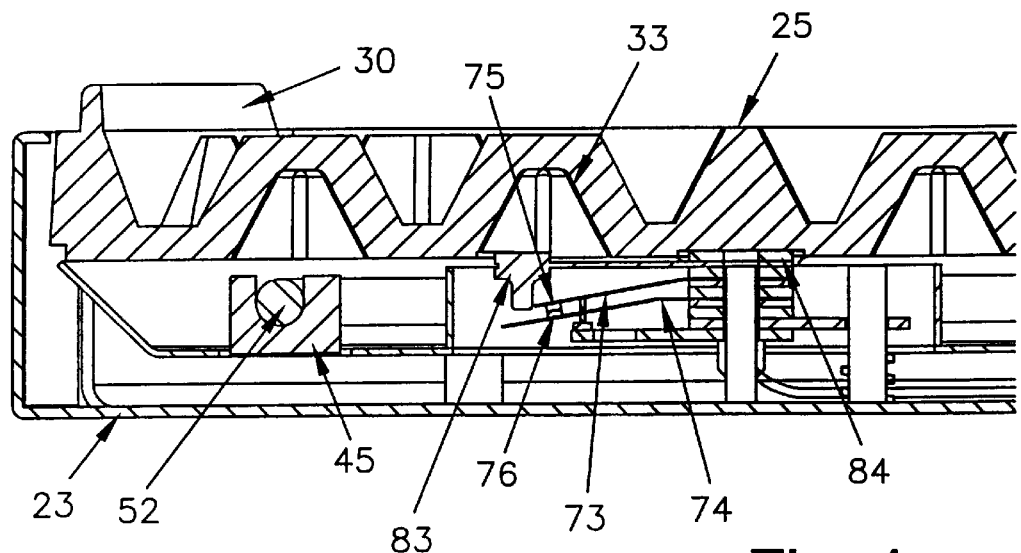
Fig. 4
Fig. 2
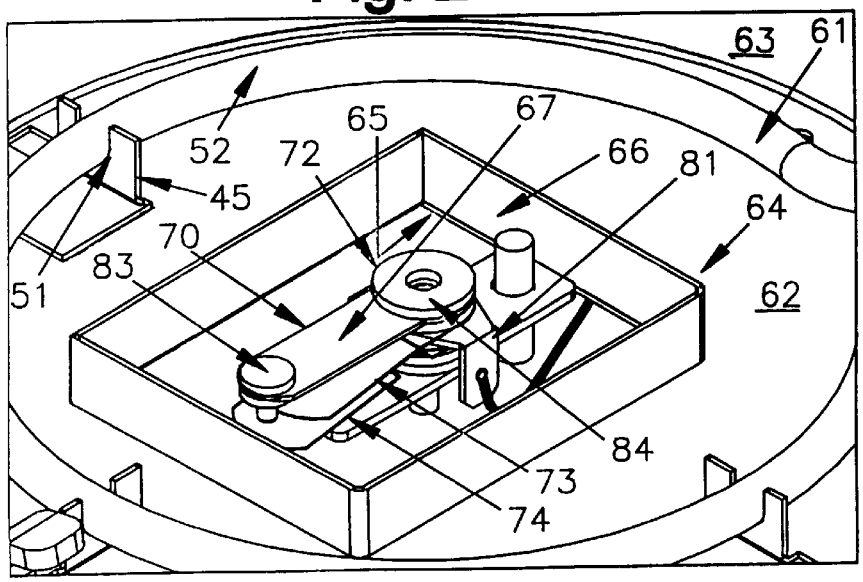

WAFFLE BAKER WITH IMPROVED BAKING CONSISTENCY

FIELD OF THE INVENTION

The present invention relates to a waffle baker with improved baking consistency. More particularly, to such a waffle baker with light weight griddles, each with a "batter dam" which prevents batter from spilling out the front and rear of the baker. The light weight griddles quickly heat up and cool down and a sensitive bi-metal contact switch is positioned with a heat collector in direct contact with one of the griddles and with a bi-metal sensing strip in close proximity to the griddle for quick sensing of and response to griddle temperature changes.

BACKGROUND OF THE INVENTION

Restaurants and other commercial institutions which bake large quantities of waffles require specialized waffle bakers. Traditionally, such commercial waffle bakers have used heavy aluminum griddles which act as substantial heat sinks. Some type of thermal sensor, such as a bi-metal sensor, is used to sense the temperature of the griddles in order to control the application of heat to them. Due to the substantial heat sinks represented by the heavy griddles, they are relatively slow to heat up and also relatively slow to cool down, which results in cyclical baking cycles of considerable duration. Due to this relatively long cycle, internal baking temperature in prior art bakers can vary between, for example, 300 and 500 degrees Fahrenheit. Waffle batter which is deposited on the griddles can enter at one temperature extreme or the other, or at any point between. Thus, depending upon which point in the temperature cycle it starts baking, complete waffle baking time can vary from approximately two minutes to about four minutes. This makes it difficult to turn out consistent waffles, particularly where waffles are timer baked, as they are in most commercial establishments.

In addition, commercial waffle bakers consistently have the problem of batter spilling out from the front and rear of the baker from between the griddles. This results in batter being splattered over customers and cooks, as well as fouling the baker in places which are difficult to clean.

It is clear, then, that a need exists for an improved waffle baker for commercial use. Such a waffle baker should have a short duration temperature cycle, should be capable of quickly and efficiently baking consistent waffles based entirely upon a timed baking cycle, and should be designed to prevent batter from spilling over the front and rear of the baker.

SUMMARY OF THE INVENTION

The present invention is a waffle baker with improved baking consistency. The waffle baker includes a base attached to a vertical housing which supports a clam shell style baker assembly such that the baker assembly can be freely rotated relative to the vertical housing. The baker assembly includes an upper and a lower shell, within each of which is mounted a respective stainless steel bowl which acts as a heat reflecting shield. A series of tabs are positioned on and extend upward from each of the reflective bowls with each tab being sized and shaped to receive and support a portion of a heating cal rod such that each cal rod is suspended in position above the respective reflective bowl. The lower shell reflecting bowl includes a central opening which is surrounded by an upstanding perimeter wall. The central opening is sized to receive a bi-metal switch, a sensing portion of which extends upward past the surrounding wall. Each of the upper and lower shells includes a peripheral ledge which receives and supports a respective mating waffle baking griddle with the griddles being secured into position within each of the shells. Each of the griddles is made of a light weight, heat conducting but low heat retention material, such as cast aluminum, for example. This allows the griddles to be rapidly heated and cooled via respective heating cal rods positioned within the upper and lower shells. Both griddles include a relatively flat bottom surface and each includes a central recess with one or more surrounding recesses. When the lower griddle is placed onto the lower shell, the central recess receives the heat collector of the bi-metal switch while one of the surrounding recesses receives an insulated actuator button of the bi-metal switch allows a bi-metal sensing arm of the switch to be placed in close proximity to the griddle bottom. This insures that temperature changes of the bottom griddle are virtually instantaneously sensed by the heat collector and the bi-metal sensing arm. Finally, each griddle has a "batter dam" integrally formed therewith which, when the griddles are positioned within the respective shells, acts to prevent batter from spilling over the front and rear of the baker as a waffle is baking. The combination of light-weight griddles, efficient bi-metallic temperature sensing, and heat reflective bowls within which are suspended efficient cal rods combine to produce a waffle baker which is very efficient and which produces consistent waffles based entirely upon timed baking periods. As an added convenience, a timer can be provided which is operated via a limit switch actuated automatically when the clam shell baker is first turned over after batter is applied to the griddles.

OBJECTS AND ADVANTAGES OF THE INVENTION

The objects and advantages of the invention include: providing a waffle baker with improved baking consistency; providing such a waffle baker with light-weight griddles which quickly heat up and cool down; providing such a waffle baker which includes a clam shell structure with upper and lower shells, each equipped with internal heat reflecting bowls which efficiently reflect heat from suspended cal rods towards respective upper and lower waffle griddles mounted on the shells; providing such a waffle baker in which a bi-metal thermal switch is positioned relative to one of the waffle griddles to provide virtually instantaneous temperature sensing and control of the waffle griddles; providing such a waffle baker in which the bi-metal switch is positioned in a center opening of one of the heat reflecting bowls and is surrounded by a perimeter upstanding wall which isolates the bi-metal switch from infra-red heat generated by the surrounding cal rod; providing such a waffle baker which bakes waffles of a more consistent quality in a shorter time period than prior art waffle bakers; providing such a waffle baker with a batter dam which prevents batter from spilling out of the front and rear of the baker; providing such a waffle baker with a timer which is automatically started upon rotation of the waffle baker; and providing such a waffle baker which is economical and which is particularly well suited for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 2 is a greatly enlarged, fragmentary view of a central portion of the lower shell, showing a central opening in the lower shell heat reflecting bowl, illustrating upstanding perimeter walls surrounding the central opening and a bi-metal thermal switch assembly positioned within the central opening.

FIG. 3 is a greatly enlarged, fragmentary cross sectional view of a portion of the bottom shell and griddle of the waffle baker of FIG. 1, taken along line 3—3 of FIG. 1 and with the lower waffle griddle positioned on the lower shell, with a bi-metal thermal switch shown in an open, high temperature condition.

FIG. 4 is a greatly enlarged, fragmentary cross sectional view of a portion of the lower shell and griddle of the waffle baker of FIG. 1, also taken along line 3—3 of FIG. 1, with the lower waffle griddle positioned on the lower shell, with the bi-metal thermal sensing element shown in a closed, low temperature condition.

DETAILED DESCRIPTION OF THE INVENTION

Figure 1:
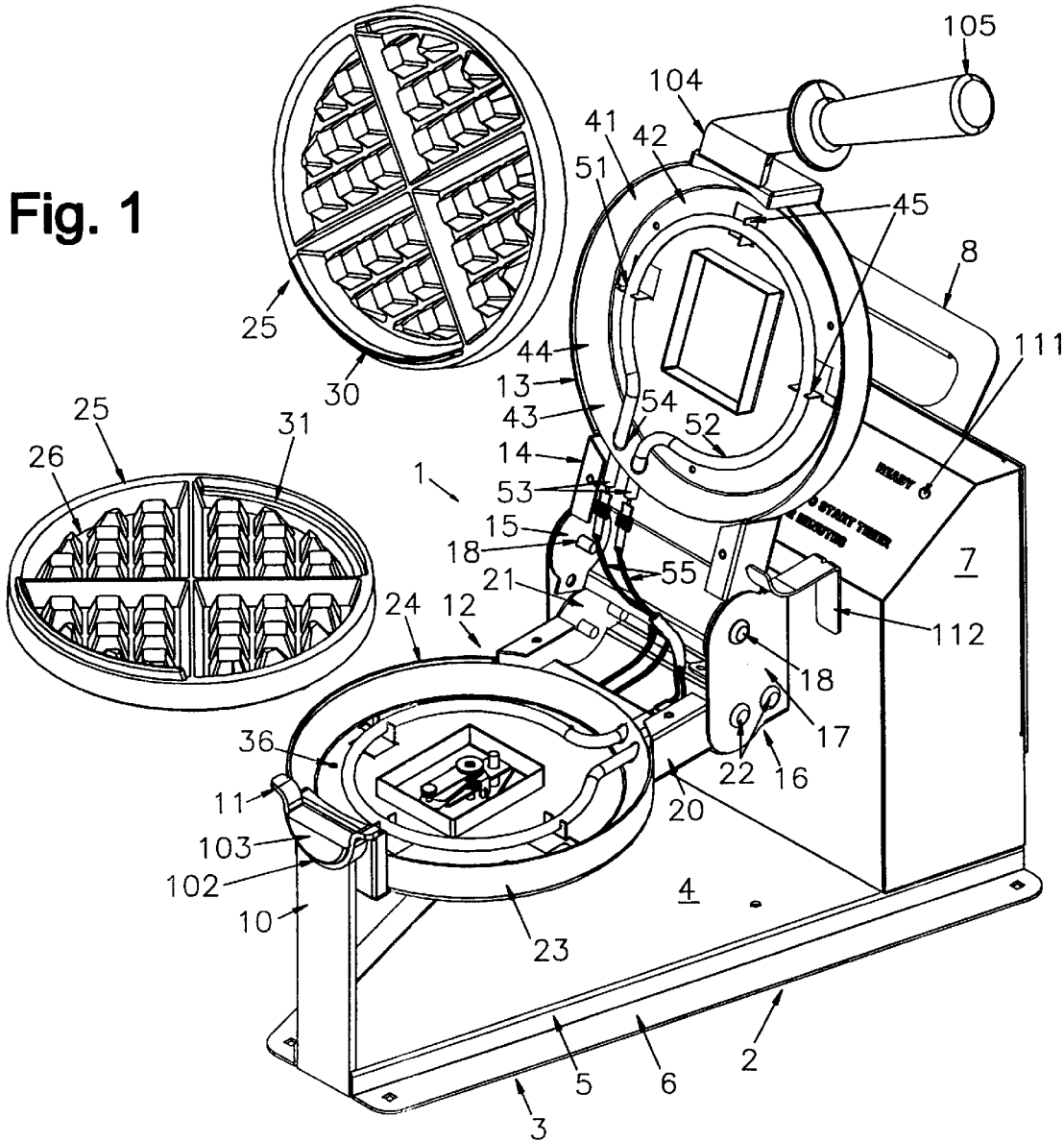
FIG. 1 is a partially exploded, perspective view of a waffle baker in accordance with the present invention, with the upper and lower waffle griddles shown removed from respective upper and lower baker shells.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings, and particularly FIGS. 1–4, a waffle baker in accordance with the present invention is illustrated and generally indicated at 1. The waffle baker 1 includes a stationary stand 2 with a horizontal base 3 formed by a large flat plate 4 shaped substantially as a V and elevated from a support surface by a pair of angle members 5, each with an elongate support leg 6. The large flat plate 4 serves as an easily cleaned surface for batter dripping from the baker 1, as will be more fully explained below. A rear vertical housing 7 is positioned atop the plate 4, with the vertical housing 7 including a handle 8. A front swivel support arm 10 is attached to and extends upward from a front of the base 4 and a cradle 11 rests atop the support arm 10.

A clam shell style waffle baker assembly 12 includes an upper shell 13 attached to and extending outward from an upper support frame 14. The upper support frame 14 includes a pair of pivot extensions 15. A rotary support bracket 16 includes a pair of opposed plates 17 and respective pivot posts 18 extend there through and through respective ones of the upper support frame pivot extensions 15 such that the upper support frame 14 can be pivoted in clam shell fashion with respect to the rotary support bracket 16.

A lower support frame 20 includes a pair of opposed extensions 21 which are attached to respective ones of the rotary support bracket opposed plates 17 via respective pairs of screws 22 such that the lower support frame 20 is fixed with respect to the rotary support bracket 16. A lower shell 23 is attached to and extends outward from the lower support frame 20. The assembly 12 thus acts as a clam shell such that the upper shell 13 can be pivoted from an open position, as shown in FIG. 1, down to a closed position in which it is positioned just above and in alignment with the lower shell 23. It should be noted that the terms "upper shell" and "lower shell" as used herein are merely by way of reference to the drawings since the positions of the shells are reversed during waffle baking.

Figures 5, 6:
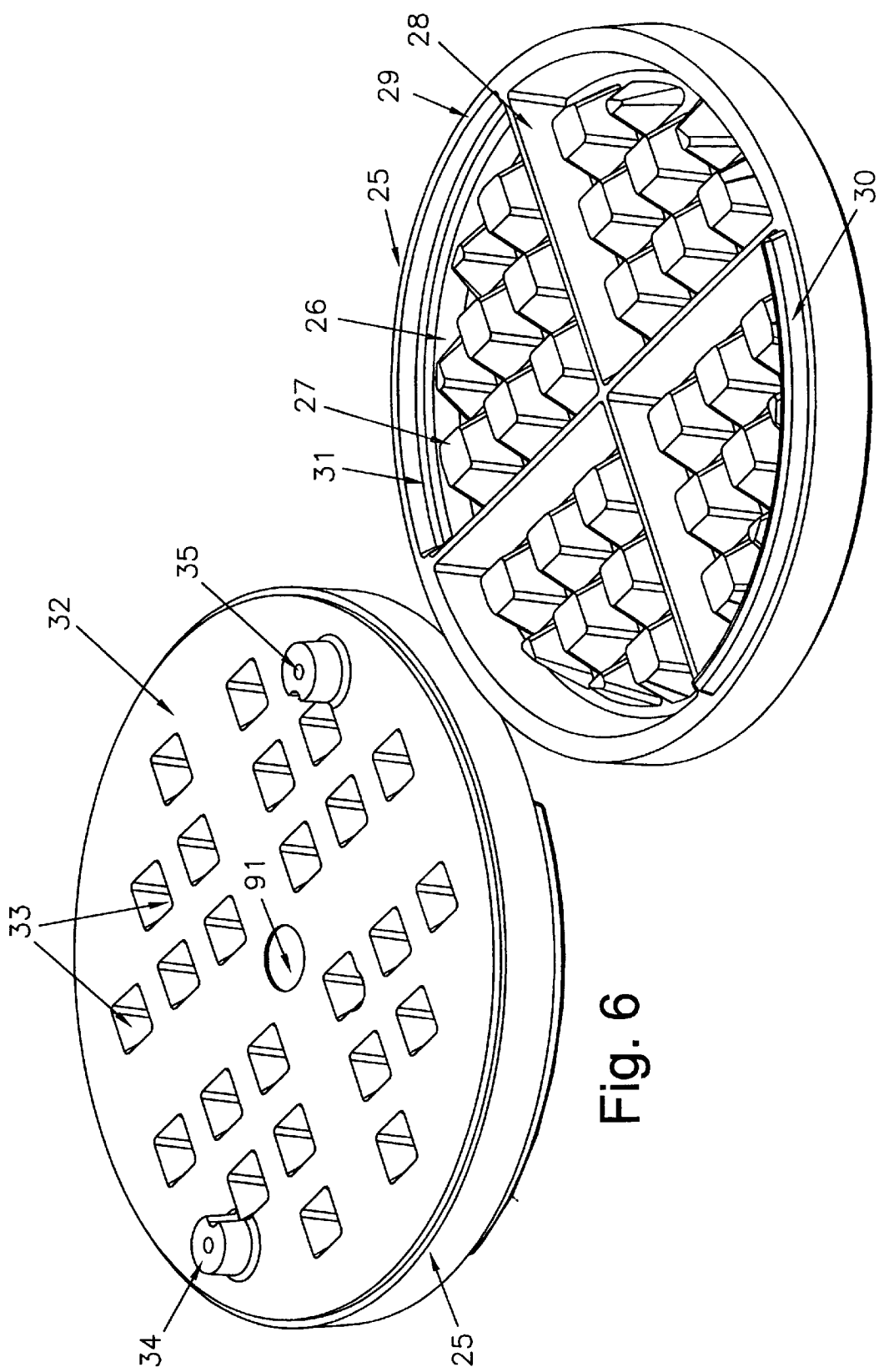
FIG. 5 is a perspective view of one of the griddles showing the top side thereof.
FIG. 6 is a perspective view of one of the griddles showing the bottom side thereof.

Both the upper shell 13 and the lower shell 23 include a peripheral wall 24 which is sized to accommodate a respective one of a pair of mating waffle griddles 25. Each waffle griddle 25 is made of a light weight, efficient heat conducting material, such as, for example, cast aluminum. Referring to FIGS. 5 and 6, each waffle griddle 25 has a standard griddle surface 26 with a plurality of protrusions 27 divided into four sections by upstanding section dividers 28 and a perimeter wall 29. A batter dam 30 is provided atop the perimeter wall which batter dam, in one embodiment, encompasses about 25% of the circumference of the perimeter wall 29. A batter dam receptacle 31, which is an indented section of the perimeter wall 29, is sized and positioned to receive the batter dam 30 of a mating, identical griddle 25 when the griddles 25 are placed on the respective upper and lower shells 13 and 23, and the baker is closed.

FIG. 6 illustrates a bottom surface 32 of the griddle 25 with a plurality of generally rectangular recesses 33 formed therein to reduce the mass of the griddle 25. A pair of support legs 34 are attached to and extend downward from the bottom surface 32, with each leg 34 including a threaded bore 35 to receive a respective screw (not shown) which extends through a receiving bore 36 in either the upper or lower shells 23 or 13, respectively, to secure the griddle 25 in position therein.

The upper shell 13 contains a plate 41, which is preferably made of a highly heat reflective material, such as stainless steel. The plate 41 includes a flat portion 42 with a number of angled side walls 43 extending upward and outward therefrom to form, with the flat portion 42, an upper heat reflective bowl 44. A plurality of tabs 45 are attached to and extend outward from the flat portion 42, with each tab 45 including a recess 51 which accommodates a circumference of a cal rod 52 such that the cal rod 52 is suspended off of the surface of the flat portion 42 by the tabs 45. The cal rod 52 has opposing ends 53 which extend through respective openings 54 in a rear of the upper housing 13 to connect with respective lower electrical leads 55.

The lower shell 23 contains a plate 61 (FIG. 2), which is also preferably made of a highly heat reflective material, such as stainless steel. The plate 61 also includes a flat portion 62 with a number of angled side walls 63 extending upward and outward therefrom to form a heat reflective bowl 64. A plurality of tabs 45 are attached to and extend outward from the flat portion 62, with the tabs 45 being identical in form and function to those described earlier with respect to the upper shell 13. A second cal rod 52 is positioned on the tabs 45 such that it is also suspended off of the surface of the flat portion 62 by the tabs 45. The cal rod 52 also has opposing ends 53 which extend through respective openings 54 in a rear of the lower shell 23 to also connect with respective lower electrical leads 55.

The lower plate 61 includes a generally rectangular opening 65 formed therein which is surrounded by a continuous upstanding perimeter wall 66 which can be portions of the plate 61 folded upward at an approximate 90 degree angle relative to the flat portion 62. The central opening 65 is sized to receive a bi-metal thermal sensor and switch assembly, generally indicated at 67. The assembly 67 includes a bi-metal temperature sensing strip 70 which is supported by and sandwiched between a heat collector button 72 and an insulating button 84. A pair of electrical contact strips 73 and 74 are also supported by and sandwiched between additional stacked insulating buttons 84. Upper and lower point contacts 75 and 76 are supported by the contact strips 73 and 74, respectively. Each contact strip is attached to a respective terminal 81, which terminals 81 lead to respective electrical leads 55 which control application of current to the cal rods 52. An additional insulating actuator button 83 is attached to and sandwiches an opposite end of the bi-metal sensing strip 70. The actuator button 83 is shaped and positioned to contact the lower contact strip 74 when the bi-metal strip 70 flexes downward in response to the application of heat thereto. As shown in FIG. 3, the downward flexing of the bi-metal strip 70 thus serves to force the button 83 into contact with the contact strip 74 to force the contact points 75 and 76 apart, which acts to open a circuit and remove electrical current from the cal rods 52, in well known manner. Conversely, as shown in FIG. 4, the upward flexing of the bi-metal strip 70 as it cools serves to pull the button 83 upward away from contact with the contact strip 74, which allows the contact points 75 and 76 to spring back together, which acts to close the circuit and reapply electrical current to the cal rods 52. The temperature range of the assembly 67 is preferably factory preset for optimum waffle baking temperatures and high and low temperature limits. In one embodiment, a range of 20 degrees Fahrenheit between on and off temperatures was found to be satisfactory. Meanwhile, the positioning of the sensor and switch assembly 67 within the opening 65 formed in the lower plate 61, and the upstanding perimeter wall 66 which continuously surrounds the opening 65 and the assembly 67 serve to isolate the assembly 67 from the effects of infra-red heat from the cal rods 52, as well as reflected heat from the lower plate 61 such that the bi-metal strip 70 solely senses the temperature of the griddle 25.

The griddles 25 each also include a central recess 91 formed in the bottom surface 32 thereof. When the lower griddle 25 is properly positioned on the lower shell 23, the heat collector button 72 is received within the central recess 91 and the actuator button 83 is received within one of the recesses 33. The heat collector button 72 is thus placed in direct contact with the lower griddle 25 via the cental recess 91. Furthermore, in providing a receptacle for the heat collector button 72 and the actuator button 83, the recesses 91 and 33, respectively, allow a considerable length of the bi-metal strip 70 to come into very close proximity with the bottom surface 32 of the griddle 25, as shown in FIG. 3. This insures that the strip 70 virtually instantaneously senses temperature changes in the lower griddle 25, as when waffle batter is first poured onto it.

Figure 7:
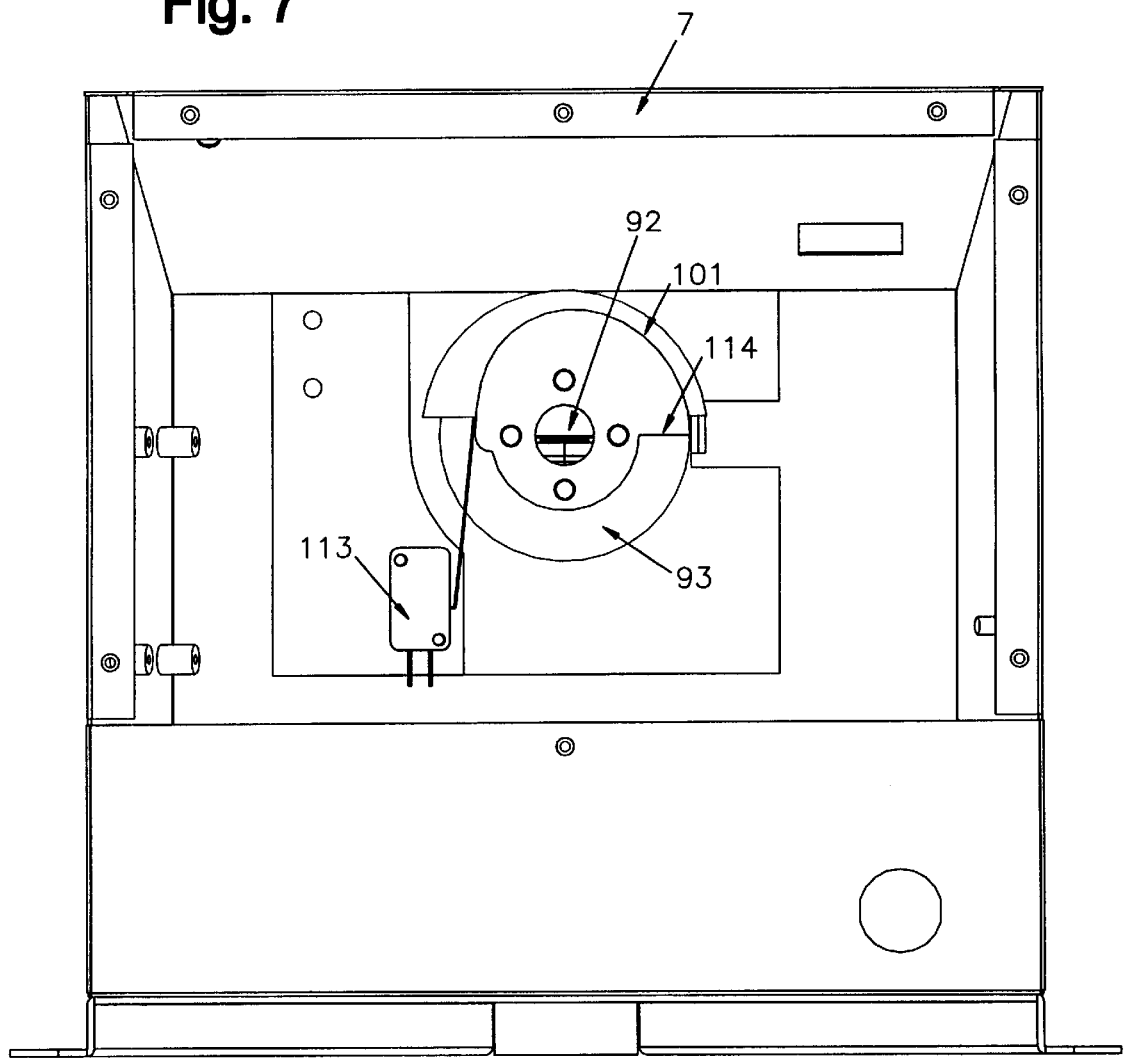
FIG. 7 is a greatly enlarged, fragmentary rear elevational view of the waffle baker of FIG. 1, illustrating a timer switch which is automatically closed when the clam shell style waffle baker is rotated relative to the stationary stand.

FIG. 7 illustrates a rear view of the vertical housing 7 which acts as a swivel support for the waffle baker assembly 12. The assembly 12 includes a protruding shaft 92 which extends through a bearing (not shown) positioned within an opening in the vertical housing 7. A collar 93 is positioned around a terminal end of the shaft 92, with the collar 93 having an outer circumference larger than the outer diameter of the shaft 92. The shaft 92 is thus free to rotate within the bearing, with the entire waffle baker assembly 12 also rotating therewith. The front swivel support cradle 11 (FIG. 1) forms a semi-circular support surface 102 which is positioned to receive a mating semi-circular extension 103 of the lower shell 23. The upper shell 13 also has an attached mating semi-circular extension 104 to which is attached a handle 105. During operation of the waffle baker 1, a switch 106 (FIG. 8) is turned on to apply current to the cal rods 52 via the bi-metal switch contacts 73 and 74, and the electrical leads 55, thus heating the griddles 25 to the temperature point at which the bi-metal strip 70 opens the circuit created by the contact points 75 and 76. A ready light 111 can be provided to indicate the reaching of this temperature. The upper shell 23 is then pivoted upward to the open position shown in FIG. 1, and waffle batter is poured onto the lower griddle 25, the upper shell 13 is pivoted downward until the griddles 25 come together, and the handle 105 is grasped and used to turn the waffle baker assembly 12 180 degrees relative to the rear vertical housing 7. A bracket 112 is attached to the front of the vertical housing 7, which bracket 112 prevents the rotation of the waffle baker assembly 12 when it is in the open position of FIG. 1.

With all waffle bakers, steam generated during the baking process drives some of the batter out between the griddles, such as the griddles 25. With the inventive baker 1, when the griddles 25 are positioned in the respective upper and lower shells 13 and 23, the batter dam 30 of one of the griddles 25 is positioned in the front of the baker 1 immediately above the support cradle 11, while the batter dam 31 of the mating griddle 25 is positioned opposite the batter dam 30 on the rear of the baker 1. The batter dams 30 and receptacles 31 act to prevent batter from spilling over the front and rear of the baker 1 and onto the handle 105, the cradle 11 and the semi-circular extensions 103 and 104. The batter dam 30 and receptacle 31 also act to prevent batter from splattering forward onto a customer or cook. Finally, by placing a drip pan (not shown) across the base plate 4, batter which drops out the sides of the baker 1 can be caught thereby and easily cleaned up.

Figure 8:
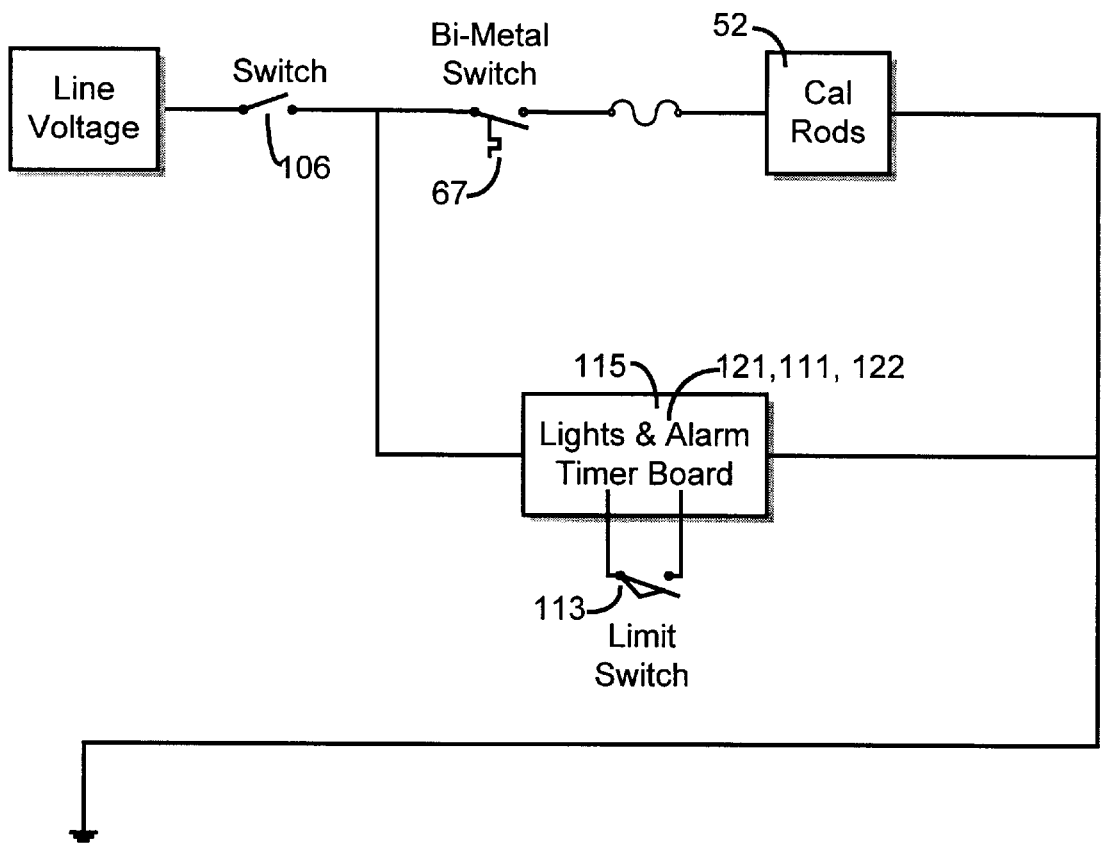
FIG. 8 is an electrical schematic diagram of the waffle baker of FIG. 1.

Referring to FIGS. 7 and 8, a limit switch 113 is positioned on the rear of the vertical housing 7. A switch operating cam 114 is attached to the collar 93 in a position such that it contacts the limit switch 113 to automatically trigger a timer circuit board 115 (FIG. 8) when the waffle baker assembly 12 is rotated 180 degrees. The timer circuit 115 then monitors a predetermined waffle cooking period, such as, for example, two minutes, and triggers visual and/or audible alarms 121 and 122, respectively, once the timed period is up. This automatic triggering of the timer board 115 via the limit switch 113 saves a conscious step by a person using the waffle baker 1 and insures that a signal will be automatically generated to remind a user to remove each waffle at the same baking cycle time. Once started, the timer cannot be reset until it runs its course, thus preventing accidental timer reset and overdone waffles. The visual signal can be, for example, rapid blinking of the ready light 111.

Experiments have shown that the inventive waffle baker 1 has achieved a 50% reduction in the electrical energy required to bake a waffle and a reduction from a standard baking time of about 3 to 3.5 minutes to a consistent baking time of about 2 minutes.

While the waffle baker 1 has been illustrated and described in a preferred embodiment, numerous variations will occur to one of ordinary skill in the art. For example, while the shape of the griddles 25 and the shells 13 and 23 have been shown as generally circular, other shapes could be used. Materials described herein for the reflective bowls 44 and 64 and the waffle griddles 25 are exemplary only, and other suitable heat reflective and heat conductive materials, respectively, could be used as well. It is thus to be understood that while certain forms of the present invention have been illustrated and described herein, it is not to be limited to the specific forms or arrangement described and shown.

We claim:

1. In a waffle baker which includes an upper and a lower shell which are attached to a vertical housing such that they can be pivoted toward and away from each other in clam shell fashion, the upper shell mounting a first waffle griddle and a first cal rod for heating the first waffle griddle and the lower shell mounting a second waffle griddle and a second cal rod for heating the second waffle griddle, the improvement comprising:

(a) an upper heat reflecting bowl positioned within said upper shell;

(b) a lower heat reflecting bowl positioned within the lower shell;

(c) a plurality of tabs attached to and extending downward from the upper heat reflecting bowl, said tabs supporting the first cal rod in a position between the upper heat reflecting bowl and the first waffle griddle; and (d) a plurality of tabs attached to and extending upward from the lower heat reflecting bowl, said tabs supporting the second cal rod in a position between the lower heat reflecting bowl and the second waffle griddle.

2. The improvement as in claim 1, and further comprising:

(a) an opening in one of said upper or lower heat reflecting bowls;

(b) a perimeter wall surrounding said opening; and (c) a temperature sensing assembly positioned within said bowl opening such the temperature sensing assembly is isolated from reflected heat from the said one of said upper or lower heat reflecting bowls and from infra-red heat from the cal rod attached to the tabs in said one of said upper or lower heat reflecting bowls.

3. The improvement as in claim 2, wherein said temperature sensing assembly comprises a bi-metal thermal switch including a bi-metal temperature sensing strip and at least one heat collector positioned between the bi-metal sensing strip and the griddle in said one of said upper or lower heat reflecting bowls, and the griddle includes a depression in a bottom surface thereof which is sized and positioned to receive said heat collector such that said heat collector is placed in direct contact with the griddle and said bi-metal sensing strip is placed in close proximity to said griddle.

4. The improvement as in claim 1, wherein each of said griddles is made of a light-weight cast aluminum and includes depressions formed in a bottom surface thereof to reduce the mass of the griddle.

5. The improvement as in claim 1, wherein at least one of said griddles includes a batter dam which extends upward from a portion of the perimeter of the griddle.

6. The improvement as in claim 5, wherein the batter dam of said at least one griddle is positioned in a frontal area of said waffle baker to prevent batter from spilling over the front thereof.

7. The improvement as in claim 5, wherein each of said griddles includes a batter dam with the batter dam of one of said griddles is positioned in a frontal area of said waffle baker to prevent batter from spilling over the front thereof and the batter dam of the other of said griddles is positioned in a rear area of said waffle baker to prevent batter from spilling over the rear thereof.

8. The improvement as in claim 1, wherein the upper and lower shells are attached to the vertical housing such that they can be collectively rotated relative to the vertical housing, said baker further comprising a timer circuit actuated by a switch, said switch being positioned such that it is automatically closed upon collective rotation of said upper and lower shells through a predetermined arc.

9. In a waffle baker which includes an upper and a lower shell which are attached to a vertical housing such that they can be pivoted toward and away from each other in clam shell fashion, the upper shell mounting a first waffle griddle and a first cal rod for heating the first waffle griddle and the lower shell mounting a second waffle griddle and a second cal rod for heating the second waffle griddle, the improvement comprising:

(a) an upper heat reflecting bowl positioned within said upper shell;

(b) a lower heat reflecting bowl positioned within the lower shell;

(c) an opening in one of said upper or lower heat reflecting bowls;

(d) a perimeter wall surrounding said opening; and (e) a temperature sensing assembly positioned within said bowl opening such that the temperature sensing assembly is isolated from reflected heat from the said one of said upper or lower heat reflecting bowls and from infra-red heat from the cal rod in said one of said upper or lower heat reflecting bowls.

10. The improvement as in claim 9, and further comprising:

(a) a plurality of tabs attached to and extending downward from the upper heat reflecting bowl, said tabs supporting the first cal rod in a position between the upper heat reflecting bowl and the first waffle griddle; and (b) a plurality of tabs attached to and extending upward from the lower reflecting bowl, said tabs supporting the second cal rod in a position between the lower heat reflecting bowl and the second waffle griddle.

11. The improvement as in claim 9, wherein said temperature sensing assembly comprises a bi-metal thermal switch including a bi-metal temperature sensing strip and at least one heat collector positioned between the bi-metal sensing strip and the griddle in said one of said upper or lower heat reflecting bowls, and the griddle includes a depression in a bottom surface thereof which is sized and positioned to receive said heat collector such that said heat collector is placed in direct contact with the griddle and said bi-metal sensing strip is placed in close proximity to said griddle.

12. The improvement as in claim 9, wherein each of said griddles is made of a light-weight cast aluminum and includes depressions formed in a bottom surface thereof to reduce the mass of the griddle.

13. The improvement as in claim 9, wherein at least one of said griddles includes a batter dam which extends upward from a portion of the perimeter of the griddle.

14. The improvement as in claim 13, wherein the batter dam of said at least one griddle is positioned in a frontal area of said waffle baker to prevent batter from spilling over the front thereof.

15. The improvement as in claim 13, wherein each of said griddles includes a batter dam with the batter dam of one of said griddles is positioned in a frontal area of said waffle baker to prevent batter from spilling over the front thereof and the batter dam of the other of said griddles is positioned in a rear area of said waffle baker to prevent batter from spilling over the rear thereof.

16. The improvement as in claim 9, wherein the upper and lower shells are attached to the vertical housing such that they can be collectively rotated relative to the vertical housing, said baker further comprising a timer circuit actuated by a switch, said switch being positioned such that it is automatically closed upon collective rotation of said upper and lower shells through a predetermined arc.

17. In a waffle baker which includes an upper and a lower shell which are attached to a vertical housing such that they can be pivoted toward and away from each other in clam shell fashion, the upper shell mounting a first waffle griddle and a first cal rod for heating the first waffle griddle and the lower shell mounting a second waffle griddle and a second cal rod for heating the second waffle griddle, the improvement comprising:

(a) a temperature sensing assembly positioned within one of said upper or lower shells, said temperature sensing assembly comprising a bi-metal thermal switch including a bi-metal temperature sensing strip and at least one heat collector positioned between the bi-metal sensing strip and the griddle in said one of said upper or lower heat reflecting bowls; and wherein (b) the griddle includes a depression in a bottom surface thereof which is sized and positioned to receive said heat collector such that said heat collector is placed in direct contact with the griddle and said bi-metal sensing strip is placed in close proximity to said griddle.

18. The improvement as in claim 17 and further comprising:

(a) a lower heat reflecting bowl positioned within the lower shell;

(b) an upper heat reflecting bowl positioned within the upper shell;

(c) an opening in said lower heat reflecting bowl;

(d) a perimeter wall surrounding said opening; and wherein (e) said temperature sensing assembly is positioned within said lower bowl opening such the temperature sensing assembly is isolated from reflected heat from the said one of said upper or lower heat reflecting bowls and from direct heat from the cal rod attached to the tabs in said one of said upper or lower heat reflecting bowls.

19. The improvement as in claim 18, and further comprising:

(a) a plurality of tabs attached to and extending downward from the upper heat reflecting bowl, said tabs supporting the first cal rod in a position between the upper heat reflecting bowl and the first waffle griddle; and (b) a plurality of tabs attached to and extending upward from the lower reflecting bowl, said tabs supporting the second cal rod in a position between the lower heat reflecting bowl and the second waffle griddle.

20. The improvement as in claim 17, wherein each of said griddles is made of a light-weight cast aluminum and includes additional depressions formed in a bottom surface thereof to reduce the mass of the griddle.

21. The improvement as in claim 17, wherein at least one of said griddles includes a batter dam which extends upward from a portion of the perimeter of the griddle.

22. The improvement as in claim 21, wherein the batter dam of said at least one griddle is positioned in a frontal area of said waffle baker to prevent batter from spilling over the front thereof.

23. The improvement as in claim 21, wherein each of said griddles includes a batter dam with the batter dam of one of said griddles is positioned in a frontal area of said waffle baker to prevent batter from spilling over the front thereof and the batter dam of the other of said griddles is positioned in a rear area of said waffle baker to prevent batter from spilling over the rear thereof.

24. The improvement as in claim 17, wherein the upper and lower shells are attached to the vertical housing such that they can be collectively rotated relative to the vertical housing, said baker further comprising a timer circuit actuated by a switch, said switch being positioned such that it is automatically closed upon collective rotation of said upper and lower shells through a predetermined arc.

* * * * *